June 14, 1966  T. C. FRITZ  3,255,506
TOW TREATMENT

Filed Feb. 20, 1963  7 Sheets-Sheet 1

Theodore C. Fritz
INVENTOR.

BY R. Frank Smith
Harold M. Powell
ATTORNEYS

June 14, 1966  T. C. FRITZ  3,255,506
TOW TREATMENT

Filed Feb. 20, 1963

Theodore C. Fritz
INVENTOR.

BY R. Frank Smith
Harold N. Powell
ATTORNEYS

June 14, 1966 T. C. FRITZ 3,255,506
TOW TREATMENT
Filed Feb. 20, 1963 7 Sheets-Sheet 3

Theodore C. Fritz
INVENTOR.

BY R. Frank Smith
Harold N. Powell
ATTORNEYS

June 14, 1966  T. C. FRITZ  3,255,506
TOW TREATMENT

Filed Feb. 20, 1963  7 Sheets-Sheet 4

Theodore C. Fritz
INVENTOR.
BY R. Frank Smith
Harold N. Powell
ATTORNEYS

June 14, 1966 T. C. FRITZ 3,255,506

TOW TREATMENT

Filed Feb. 20, 1963 7 Sheets-Sheet 5

Theodore C. Fritz
INVENTOR.

BY R. Frank Smith
Harold N. Powell
ATTORNEYS

BEFORE TREATMENT

TENSIONED

RELAXED a
b
c
d
e

United States Patent Office 3,255,506
Patented June 14, 1966

3,255,506
TOW TREATMENT
Theodore C. Fritz, Kingsport, Tenn., assignor to Eastman Kodak Company, Rochester, N.Y., a corporation of New Jersey
Filed Feb. 20, 1963, Ser. No. 259,852
3 Claims. (Cl. 28—1)

This invention involves the treatment of tobacco smoke filter tow. More particularly, it involves the opening or blooming of continuous-filament filter tow.

My coworkers' patents Nos. 2,790,208, 2,843,881, 2,926,392 and 3,017,309 describe various methods for the treatment of crimped tobacco smoke filter tow by a series of steps generally consisting of banding, tensioning, relaxing and plasticizing the tow to convert it into a form which when compacted into tobacco smoke filter rods exhibits a capability of removing undesirable impurities from the smoke stream with a minimum of fluid flow resistance and permits maximum contact of the fluid stream with the tow, thereby enhancing efficiency. Such methods as these have proved highly useful to the tobacco smoke filter trade. However, in general they have either involved a striker and anvil arrangement for imparting and releasing an increment of tension or two pairs of treating rolls, for example, a set of pulling or tension rolls downstream from a set of retarded or holding-back rolls. Accordingly there now exists a market demand for other ways of producing a tow possessing the above-mentioned highly desirable characteristics in a somewhat less elaborate and less costly blooming operation. Therefore the provision of a new and different economical method and apparatus for blooming or opening the tow in such a manner as to present a large surface to the eventual smoke stream in the finished filter rod with a resultant enhanced efficiency of the filter medium represents a highly desirable result.

An object of this invention is to provide a method and apparatus for treating continuous filament filter tow in such a way as to increase the surface to be contacted by the smoke stream. Another object is to provide a novel method and apparatus for blooming crimped tobacco smoke filter tow and preparing same for conversion into filter rods of enhanced efficiency. A further object is to simplify the tow opening procedure in the production of tobacco smoke filter rods. A still further object is to provide economical means of expanding tow fibers into web with an indeterminate maze of interstices therebetween. Another object is to alternately tension and release small groups of filaments in a tow-opening or individual filament separating procedure. Further objects will be apparent hereinafter.

In its broader aspects this invention involves the use of a pair of feed rolls in the blooming or opening of tobacco smoke filter tow. These rolls are set up and operated in such a manner as to present a light contact or nip therebetween, thereby providing an area for performing the enhanced opening of the tow. They may be driven in a known manner, for example, as shown in U.S. Patent 2,843,881 of my coworkers Bishop and Tichenor. U.S. Patents 2,926,392 and 2,790,208 to my coworkers Jackson and Smith, respectively, give additional details as to driving the rolls and other structural characteristics known to the art which accordingly will not be repeated here. The surfaces of one or more of these rolls may have various configurations, for example as described hereinafter. The filter tow is rearranged by dephasing the crimped filaments. When the tow is then relaxed, the filaments do not return to the original tightly crimped bundle but remain in the desired bloomed form for compacting into filter form. This dephasing operation is accomplished by varying the movement of the top, middle and bottom filament layers. Thus, the top and bottom layers are differentially acted upon while the middle layer remains substantially passive. A differential speed belt may be used to provide a longer surface contact area and to thereby increase the time that the rolls act upon the tow. The contact time and degree of blooming may be varied. By dephasing, rearranging or blooming this crimped tow an increased surface is presented to the eventual smoke stream in the finished filter rod and the efficiency of the filter medium thereby increased. The filaments are intermittently, incrementally, longitudinally displaced. Adjacent bundles of tow filaments are alternately and intermittently debundlized, the filaments within each bundle being separated and filaments being intermixed between bundles. This longitudinal displacement of filaments may also be described as an alternate pulling and relaxing of longitudinal sections of the tow.

A further understanding of my invention may be obtained from the drawing which forms a part of the present application.

Figure 1:
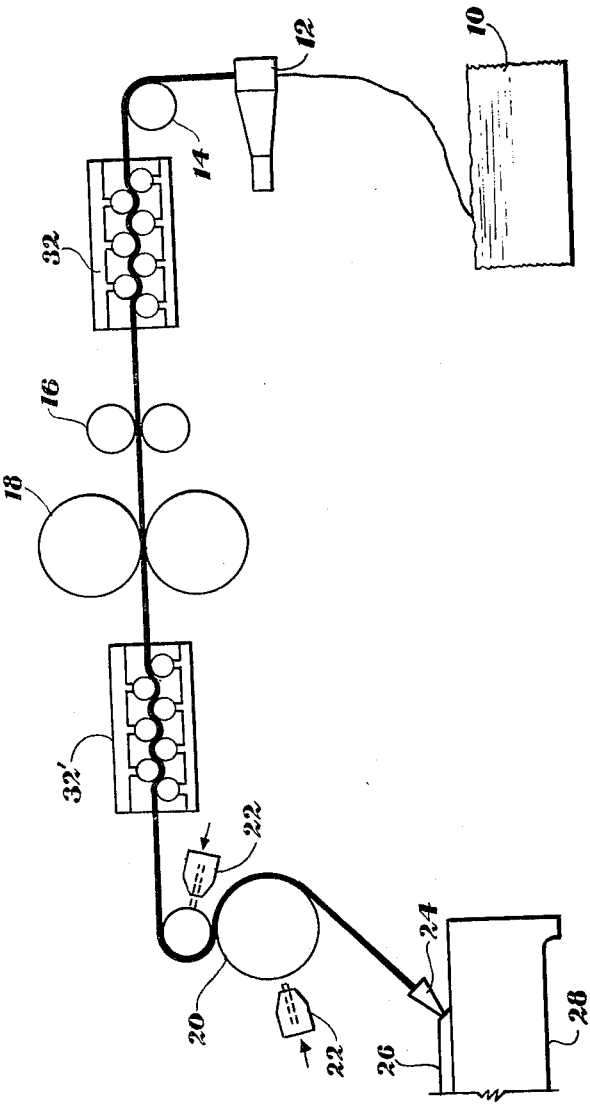
FIG. 1 is a schematic diagram of the apparatus and method of this invention for differentially blooming continuous-filament tobacco smoke filter tow.
Figure 17:
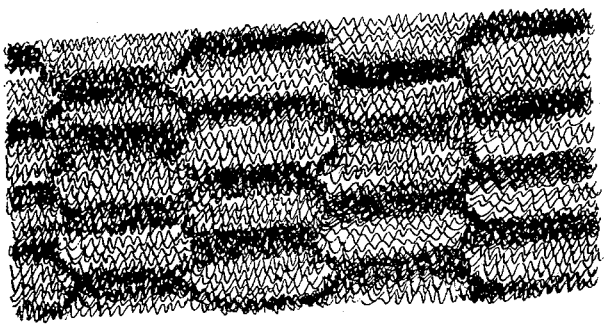
FIG. 17 is a sketch of a sample of tow treated with a roll such as that of FIG. 11.

Terms such as "upper," "lower," "above," "below," "horizontal," and the like are used to describe apparatus illustrated in the drawings and disclosed herein. However, it will be understood that these terms are used in fact merely for convenience of description and are by no means critical, and that the same apparatus will be operative to perform its function whether in the described position or disposed vertically or obliquely, or turned on its side.

Referring first to FIG. 1, the cellulose acetate crimped tow is withdrawn from bale 10 and passed through a banding device 12, for example, as in U.S. Patents 2,737,688 and 2,908,045. The banding device momentarily spreads out the fibers as the tow passes over the roll guide 14. The tow remains spread out as it leaves the roll guide surface and continues on to a tensioning device 16, such as depicted in Crawford et al. U.S. 3,017,309. These pneumatic loaded rolls 16 retard the tow on its way to the feed rolls 18. This retarding action provided by the rolls tensions the tow just enough to straighten out the crimp so a uniform length of tow is presented to the feed rolls 18. One or both of these rolls may be configured. I have achieved good results using one configured roll having alternating valleys or grooves and lands or elevations running generally parallel to the edges of the roll, with the lands or elevations having a smooth planar surface for contacting tow, thereby preventing breaking or otherwise damaging the filaments. The feed rolls 18 are in a light nip or contact and adapted to rotate at different speeds. The tow emerges in bloomed form. These rolls as well as the rolls 16 and downstream delivery rolls 20 are mounted for variable positioning so that the pressure of the bite between the rolls may be varied. Here again I prefer to use at least one configured roll, preferably the roll contacting the opposite surface of the tow from that contacted by the tension configured roll when one of the tension rolls 16 is configured, my preferred pattern again being a circular groove although other configurations may be used as detailed hereinafter to aid in accomplishing a longitudinal displacement or fluffing of filaments. The tow is next fed over delivery rolls 20 at which point plasticizer may be added to both surfaces thereof by applying plasticizer to the roll surfaces from wick applicators 22. The tow then moves to rod-shaped porous, fibrous element forming means located below and spaced in association with delivery rolls 20. In moving through the rod-shaped porous, fibrous element forming means the tow moves first through collecting trumpet 24, and finally into a garniture 26 on rod maker 28 where it is covered with wrapping material and cut to the proper length to form a filter rod. In an alternate manner plasticizer may be added from a spray booth (not shown) positioned between feed rolls 18 and delivery rolls 20.

Figure 2:
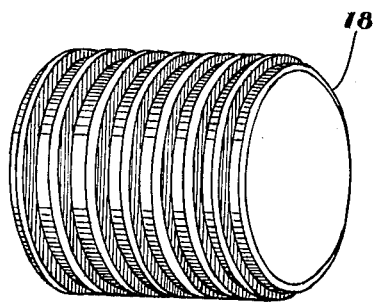
FIG. 2 is a perspective view of a groove and ridge roll surface embodiment of a feed roll which may be used in the present invention.

FIG. 2 shows roll 18 with one style of configured surface which may be used according to my invention in place of a completely smooth surface in accordance with the specific tow-surface requirement.

Figure 3:
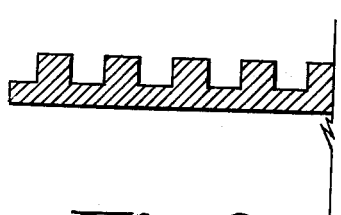
FIG. 3 is an enlarged transverse cross section through any point of the groove and ridge portion of the roll of FIG. 2.

FIG. 3 details the grooved surface of the roll of FIG. 2, showing the flat top surfaces of the ridges.

Figure 4:
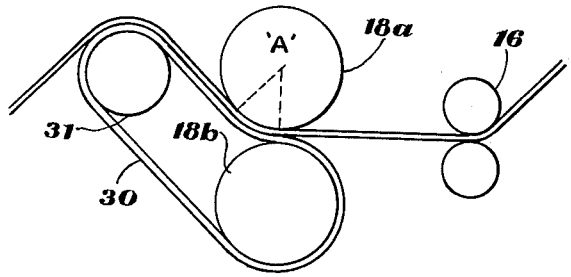
FIG. 4 is a schematic diagram of an alternative embodiment of the apparatus and method of differentially blooming tow according to the present invention.

FIG. 4 represents an alternative method of carrying out the present invention. In this embodiment like numbers are used to refer to similar parts of FIG. 1. The banded tow is received from a roller guide not shown and passed on into pre-tension rolls 16. From this retarding action a uniform length of crimped tow is fed by belt 30 between roll 18a and differentially driven roll 18b. Belt 30 is maintained in its proper running position by means of adjusting idler 31, and the contact area indicated by "A" is the enlarged treatment or contact area resulting from use of differentially driven roll 18b. The bloomed tow is then fed to a suitable plasticizer applicator and on to the rod maker as in FIG. 1.

Figure 5:
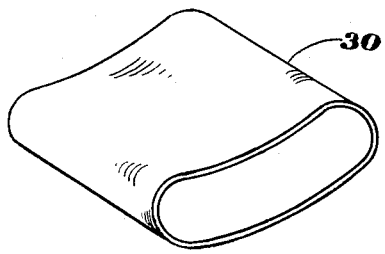
FIG. 5 is a perspective view of a differential belt representative of this type of belt which may be used in cooperation with the feed rolls in accordance with our invention.

FIG. 5 represents a belt 30 which may be used in the process depicted in FIG. 4. This belt may be of woven endless cloth 8" wide and 50" long. If desired, polyethylene or other appropriate plastic material may be used instead of cloth.

The rolls 18 or 18a and 18b may be of such materials as steel, rubber, micarta, nylon or may be covered with woven fabric. A design such as that of FIG. 2 may sometimes be helpful in enhancing the blooming of the tow. According to the present invention it is also possible by variation of number or location of rolls and of surfaces of pre-tensioning rolls to increase the degree of blooming. The tow may be presented to a differential speed work area in the particular condition desired for the specific end use. For instance, instead of only one set of rolls and belts, a combination employing several rolls and belts may be used to accomplish multiple blooming.

Figure 6:
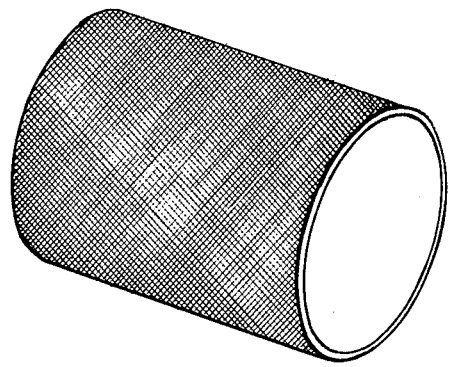
FIGS. 6–11 are perspective views of rolls having other surface patterns which may be used in accordance with our invention when one or more configured rolls are used.

FIG. 6 depicts criss-cross mesh-type roll surface pattern formed by short broken ridges extending in opposite spiral direction.

Figure 7:
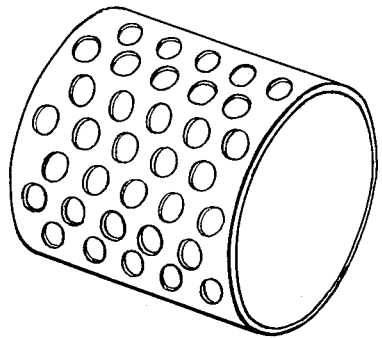

FIG. 7 shows a roll having rows of holes in the surface thereof, said holes being generally arranged in rows perpendicular to the edges or ends of the roll.

Figure 8:
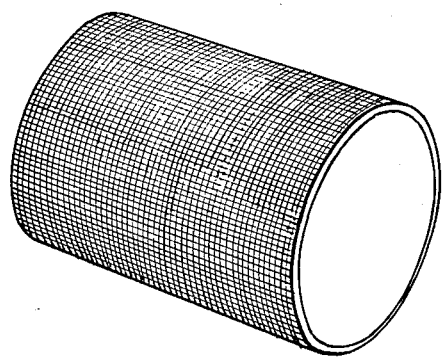

FIG. 8 depicts a roll surface pattern wherein a wire mesh effect is achieved by one set of parallel wires running perpendicular to the edges or ends of the roll and the other parallel to the edges or ends of the roll, each row of each set passing alternately over and under adjacent rows.

Figure 9:
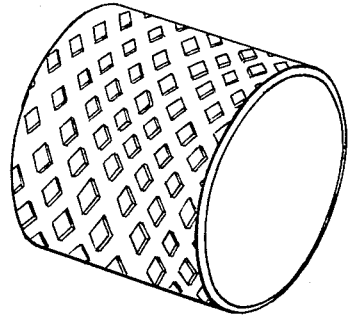

FIG. 9 depicts a series of parallel rows of small square elevations on the surface of the roll, said rows running in a spiral direction.

Figure 10:
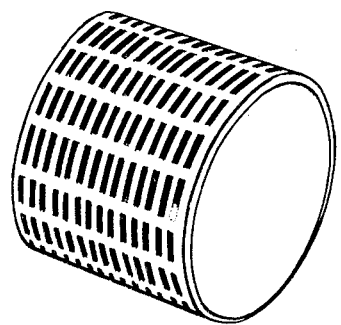

FIG. 10 shows a roll surface configuration comprising rows of notch-like indentations or slits, each row being substantially parallel to the edge or end of the roll, thus achieving what may be described in one way as a vibratory effect when tow is passed over the surface of the roll.

Figure 11:
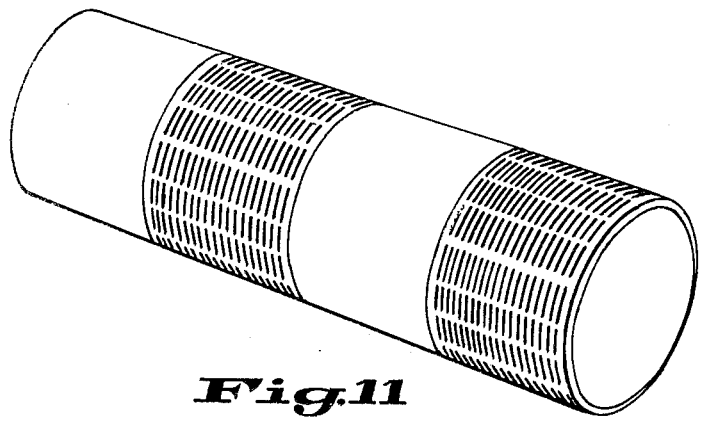

FIG. 11 pictures a roll with a segmented surface, that is, a surface having alternating non-configured and configured portions going all the way around the roll, in this particular instance the configured portions having parallel ridges and valleys surrounding the roll and directed in its direction of turn, that is, parallel to its edge or end.

Figure 12:
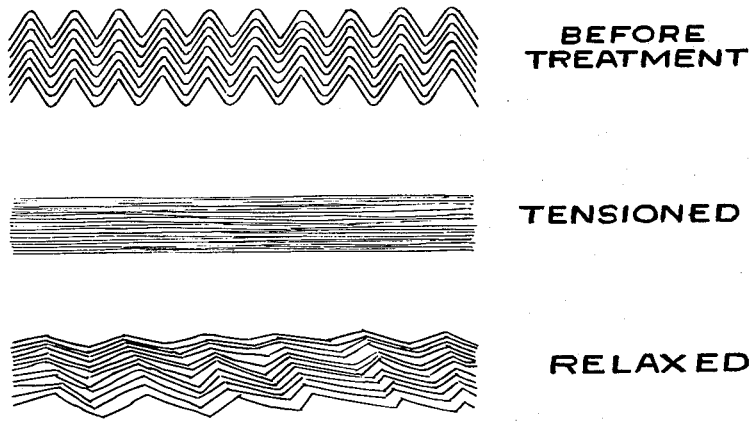
FIG. 12 is a schematic representation of the effect of prior art tensioning and relaxing process of opening tow.
Figure 13:
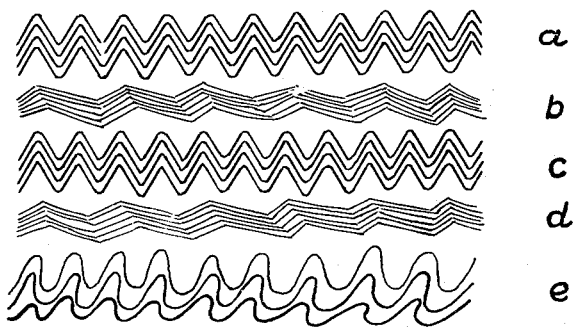
FIGS. 13–16 depict schematically the tensioning and relaxing of the tow in small groups of filaments as it takes place according to the process of this invention.
Figure 14:
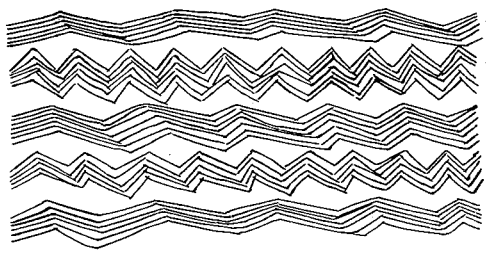
Figure 15:
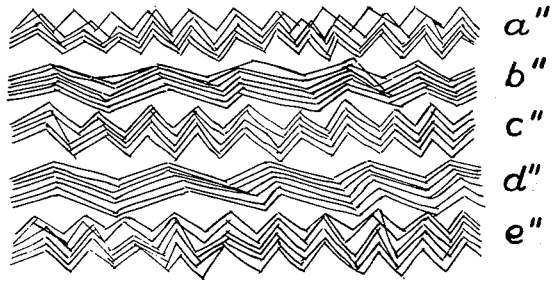
Figure 16:
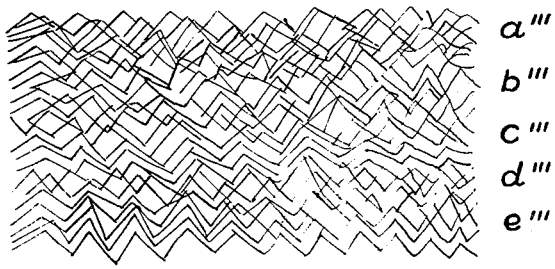

Reference is now made to FIG. 12 for a schematic representation of the effect of the prior art process of tensioning and relaxing in opening the tow. In the process described by Crawford et al., the entire tow is subjected to substantially uniform tension and relaxation; all filaments being acted upon simultaneously. The exact method of blooming is not known. It is thought to depend on the release on the residual stresses in the crimped filaments. Thus the crimps reform to varying degrees and possibly portions of some filaments rotate slightly about their axes resulting in deregistry of the crimp. To accomplish this requires a relatively high tension, stretching the filaments to an extent such that filament resiliency is lost and the crimps do not reform to the degree desired.

According to my invention, the filaments are treated in small groups as shown in FIGS. 13–16. Some groups of filaments are tensioned while at the same instant adjacent groups of filaments are not tensioned. The bloom or opening action in a group of filaments differs from the action of the process of my coworkers Crawford and Stevens in U.S. Patent 3,017,309 in that a group of tensioned filaments is displaced relative to the adjacent groups of untensioned filaments by at least a small amount, thus aiding filament separation. Thus group (a) of FIG. 13 may not be exactly the same as group (a') of FIG. 14, which again may differ slightly from (a"), FIG. 15.

Groups b, c, d and e may vary in a similar manner. The net result of the roll-opening according to my invention may be somewhat as illustrated diagrammatically in FIG. 16, when each filament is positioned in a random relationship with respect to adjacent filaments. The filaments do not appear to be straightened out to the extent that they are when the entire filament bundle is tensioned and relaxed simultaneously according to prior art blooming techniques.

In an alternate embodiment of my invention in addition to passing between feed rolls 18 of FIG. 1 or over the belt-roll arrangement of FIG. 4 the tow may be passed either before rolls 16 or after feed roll 18 or belt 30 treatment through a tension-bar or friction device zone 32 or 32'. By passage through such an arrangement a differential tensional drag is applied to closely adjacent increments of the banded tow. The zone consists of a fixed ladder-type tension device with fingers having alternate bands of high and low friction surfaces. Such a snubbing arrangement tends to aid in the longitudinal blooming effect brought about according to the present invention. The tow passes alternately over and under tension bars. The bars are fabricated so as to have $\frac{1}{10}$ to $\frac{1}{16}$ inch wide increments of high and low friction rings, the low rings being turned down to a slightly smaller diameter than that of the bar proper.

The following examples are intended to be illustrative of my invention.

Example I

The procedure used in this example is the one shown in FIG. 1. The tow used was cellulose acetate of 3 denier per filament, a total denier of 53,000, and approximately 13 crimps per inch. A series of filter plugs was made. The following machine set up was used.

| Roll (location or name): | Speed (ft./min.) and other factors |
|---|---|
| Pre-tension rolls | 210 |
| Top feed roll | 317 |
| Bottom feed roll | 238 |
| Delivery rolls | 181 |
| Differential speed, percent | 40 |
| Tape roll | 200 |
| Pre-tension air pressure, p.s.i.g. | 20 |
| Circumference, mm. | 24.6–24.9 |
| Length, mm. | 102 |
| Pressure drop, in. | 11.5–12.3 |
| Weight of 20 rods dry, g. | 15.80 |
| Weight of 20 rods wet, g. | 17.03 |
| Percent plasticizer applied, percent | 7.10 |
| Appearance of bloom [1] | |

[1] Good, producing a firm filter rod.

Example II

A portion of the same tow as used in Example I was treated according to the set up described in FIG. 4.

| Roll (location or name): | Speed (ft./min.) and other factors |
|---|---|
| Tape roll speed | 200 |
| Delivery roll speed | 224 |
| Top roll speed | 267 |
| Bottom roll speed | 828 |
| Differential speed | 3.2:1 |
| Banding jet air, p.s.i.g. | 2 |
| Pre-tension roll air, p.s.i.g. | 30 |
| Circumference, mm. | 24.2–24.8 |
| Length, mm. | 102 |
| Pressure drop, in. | 12.1–12.5 |
| Weight of 20 rods dry, g. | 16.53 |
| Weight of 20 rods wet, g. | 17.64 |
| Percent plasticizer applied, percent | 6.30 |
| Appearance of bloom [1] | |

[1] Excellent, producing a very acceptable filter rod.

Example III

A 3 D/F, 42,000 total denier tow was treated according to the set up described in FIG. 1 using as the top feed roll the roll shown in FIGS. 2 and 3.

| Roll (location or name): | Speed (ft./min.) and other factors |
|---|---|
| Tape roll speed | 360 |
| Delivery roll speed | 337 |
| Feed roll speed | 468 |
| Tension roll speed | 306 |
| Tension roll air pressure, p.s.i.g. | 10¼ |
| Feed roll air pressure, p.s.i.g. | 28½ |
| Circumference of rod, mm. | 24.8 |
| Rod length, mm. | 102 |
| Pressure drop, in. | 12 |
| Weight of rod (20 with plasticizer), g. | 14.46 |
| Weight of rod (20 dry), g. | 13.20 |
| Percent of plasticizer applied | 8.74 |
| Grams of tow per rod | .592 |
| Appearance of bloom | Good |

From the foregoing description it will be apparent that we have provided a novel differential blooming technique for the preparation of tobacco smoke filter tow of high filter efficiency.

This invention has been described in detail with particular reference to preferred embodiments thereof, but it will be understood that variations and modifications can be effected within the spirit and scope of the invention as described hereinabove and as defined in the appended claims.

I claim:

1. An apparatus for opening, advancing and creating a potentially adhesive state in a crimped continuous filament compact tow comprising in cooperative series:
   (1) pneumatic jet means for spreading said tow in a transverse direction;
   (2) a pair of frictionally retarded rotating tow-tensioning rolls in contact with each other and adapted to be rotated by the tow as it passes through the nip of the rolls;
   (3) a pair of contacting driven pulling rolls for pulling said tow through the aforesaid pneumatic jet means and tow-tensioning rolls;
   (4) one of said driven rolls having square-formed cross-section circumferential surface grooves and lands adapted for alternately pulling with lesser and greater force on adjacent portions of said tow as it passes between the nip of said rollers whereby the individual filaments of said tow are intermittently, incrementally, longitudinally displaced relative to each other;
   (5) a further pair of smooth-surfaced driven delivery rolls adapted to receive the tow forwarded from said pulling roll pair; and
   (6) means in association with said smooth-surfaced delivery rolls for applying a thin uniform film of a liquid addendum thereto for transfer to the tow as it passes in an S-wrap manner over, through the nip and under said rolls and in contact with at least 90 degrees of the circumference of said rolls;
   (7) rod-shaped porous, fibrous element forming means located below and in spaced association with said delivery rolls to receive treated tow therefrom.

2. The apparatus of claim 1 wherein the square-formed cross-section circumferential surface grooves and lands are interrupted, having smooth surfaces therebetween.

3. The apparatus of claim 1 wherein one roll of said pair of contacting, pulling rolls is driven at a greater speed than the other whereby the filaments in one surface of the tow are displaced longitudinally relative to the filaments of the opposing surface of the tow.

References Cited by the Examiner

UNITED STATES PATENTS

| 2,387,091 | 10/1945 | Ronney | 19—293 |
| 2,822,582 | 2/1958 | Hayward et al. | 19—65 |
| 2,925,628 | 2/1960 | Boer | 19—258 |
| 3,032,829 | 5/1962 | Mahoney et al. | 19—65 |
| 3,034,566 | 5/1962 | McKay. | |
| 3,079,663 | 3/1963 | Dyer et al. | 28—1 |
| 3,156,016 | 11/1964 | Dunlap et al. | 19—66 |

FOREIGN PATENTS

| 219,332 | 12/1924 | Great Britain. |

DONALD W. PARKER, *Primary Examiner.*

D. N. NEWTON, *Assistant Examiner.*